United States Patent [19]

Köhnen et al.

[11] Patent Number: 4,765,631
[45] Date of Patent: Aug. 23, 1988

[54] STUFFING BOX SEALING ARRANGEMENT

[75] Inventors: Klaus Köhnen, Mülheim; Adolf Linke; Hans Niermann, both of Essen, all of Fed. Rep. of Germany

[73] Assignee: Krupp-Koppers GmbH, Essen, Fed. Rep. of Germany

[21] Appl. No.: 829,698

[22] Filed: Feb. 13, 1986

[30] Foreign Application Priority Data

Mar. 22, 1985 [DE] Fed. Rep. of Germany ....... 3510422

[51] Int. Cl.⁴ .......................... F16J 15/18; F16J 15/40
[52] U.S. Cl. ............................................. 277/2; 277/3; 277/59; 277/64; 277/77; 277/106; 277/135
[58] Field of Search .................. 277/59, 60, 58, 17, 277/18, 3, 106, 105, 102, 135, 2, 77, 64; 73/46, 47, 49.8

[56] References Cited

U.S. PATENT DOCUMENTS

| 326,574 | 9/1885 | Mars | 277/105 |
|---|---|---|---|
| 570,726 | 11/1896 | Butts | 277/17 X |
| 722,219 | 3/1903 | Fielden | 277/60 |
| 1,015,884 | 1/1912 | Haaser | 277/64 |
| 1,759,074 | 5/1930 | Van Rijswijk | 277/135 X |
| 1,879,774 | 9/1932 | Temple | 277/105 X |
| 2,143,637 | 1/1939 | Vollmann | 277/68 X |
| 2,369,883 | 2/1945 | Coopey | 277/135 X |
| 3,180,135 | 4/1965 | Cain, Jr. et al. | 73/46 |
| 3,392,983 | 7/1968 | Hajner | 277/2 X |
| 3,403,915 | 10/1968 | Roberts | 277/59 |
| 3,589,737 | 6/1971 | Sedy | 277/2 X |
| 3,785,659 | 1/1974 | Maurer et al. | 277/59 X |
| 3,787,060 | 1/1974 | Astill et al. | 277/106 X |
| 3,834,715 | 9/1974 | Butler | 277/59 X |
| 4,093,239 | 6/1978 | Sugahara | 277/59 X |
| 4,222,575 | 9/1980 | Sekiguchi et al. | 277/59 |
| 4,270,760 | 6/1981 | Greiman | 277/3 |
| 4,353,388 | 10/1982 | Isoyama et al. | 277/59 X |
| 4,408,769 | 10/1983 | Wolff | 277/125 X |

FOREIGN PATENT DOCUMENTS

| 107690 | 6/1939 | Australia | 277/68 |
|---|---|---|---|
| 75464 | 2/1919 | Austria | 277/60 |
| 43118 | 9/1930 | Denmark | 277/68 |
| 163010 | 11/1904 | Fed. Rep. of Germany | 277/77 |
| 11463 | 1/1903 | Norway | 277/60 |
| 152967 | 2/1932 | Switzerland | 277/59 |

Primary Examiner—Allan N. Shoap
Attorney, Agent, or Firm—Michael J. Striker

[57] ABSTRACT

A stuffing box sealing arrangement for sealing a rotary shaft which extends into a pressure space includes two separate consecutive pressure chambers arranged at axially spaced locations along the shaft and an intervening space sealed with respect to the exterior of the arrangement and the pressure space and arranged between the pressure chambers. A plurality of stuffing sealing rings is accommodated in each of the pressure chambers and two glands are provided each being arranged around the shaft at one of the locations in registry with the respective associated plurality of stuffing sealing rings. Each of the glands is independently pressed against the respective associated plurality of stuffing sealing rings, and lubrication water is supplied into the intervening space to continuously lubricate both pluralities of stuffing sealing rings.

10 Claims, 1 Drawing Sheet

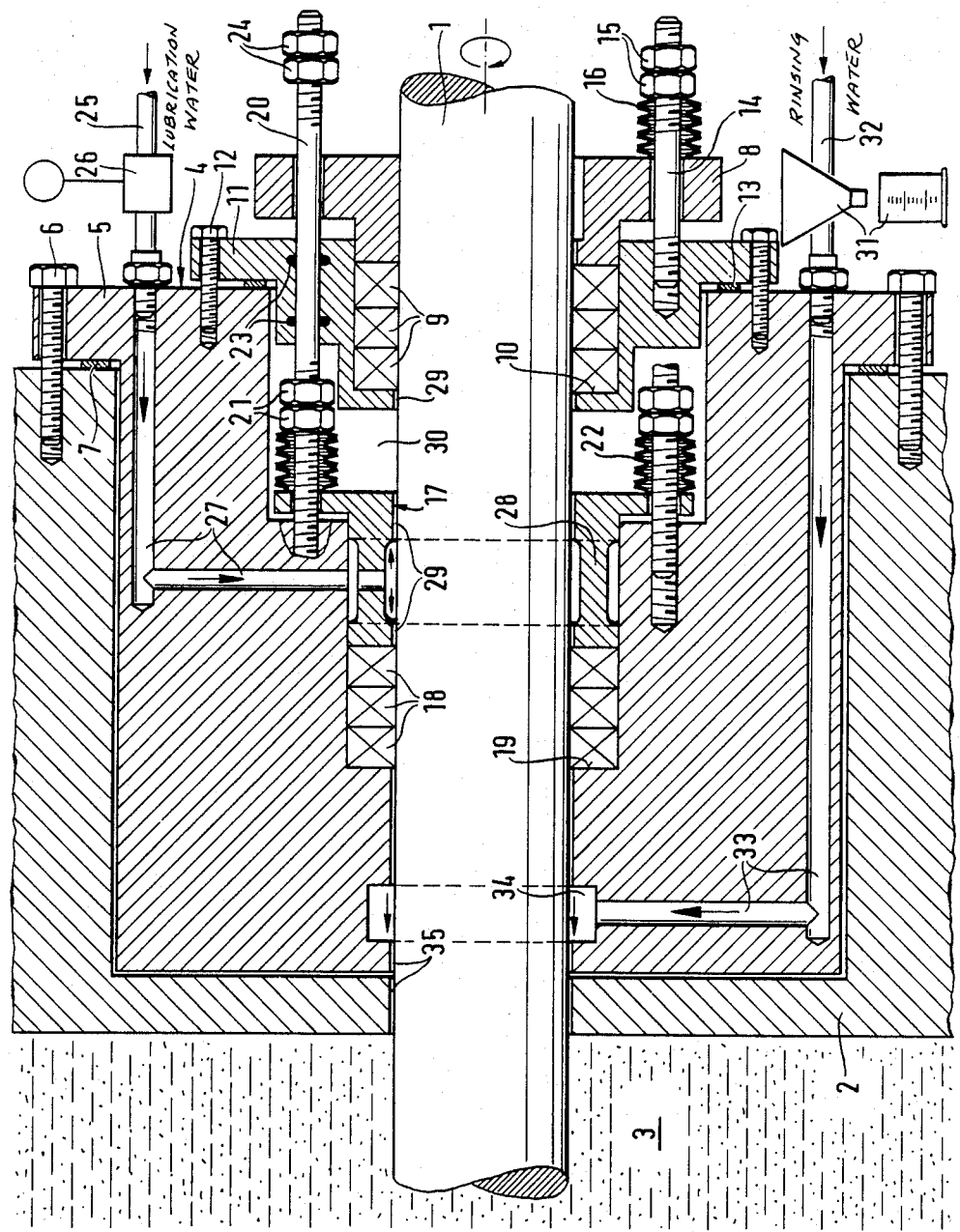

4,765,631

STUFFING BOX SEALING ARRANGEMENT

BACKGROUND OF THE INVENTION

The present invention relates to stuffing box sealing arrangements in general, and more particularly to a stuffing box sealing arrangement for a rotary shaft extending into a pressure space.

There are already known various constructions of stuffing box sealing arrangements, among them such which include two sealing chambers in which there are accommodated respective stuffing sealing rings which may have different properties. A distribution chamber for lubrication is arranged between these two sealing chambers, this distribution chamber being mounted on the shaft for relative axial displacement. In this construction, the lubrication water penetrates from the distribution chamber into the two adjacently situated sealing chambers where it comes into contact with and lubricates and cools the region of contact of the outer circumferential surface of the shaft with the respective stuffing sealing rings, as a result of which the stuffing sealing rings are prevented from becoming excessively hot. Only a single stuffing box gland is being used in this known stuffing box sealing arrangement for the pressing of the stuffing sealing rings in both of the sealing chambers, this gland acting directly on the stuffing sealing rings of the adjacent, that is, of the outer, sealing chamber and indirectly via the distribution chamber on the stuffing sealing rings of the inner sealing chamber, that is, of the sealing chamber that is situated closer to the pressure space. It will be easily appreciated that a purposeful application of different forces to the stuffing sealing rings accommodated in each of the two sealing chambers correspondingly to the requirements for the two sealing chambers is not possible in this arrangement. Rather, there exists the danger that, when an insufficient sealing effect is encountered at the stuffing sealing rings accommodated in one of the sealing chambers and the stuffing box gland is tightened to overcome such diminished sealing action, the stuffing sealing rings received in the other sealing chamber are compressed excessively and, in this manner, supply of lubrication water to such excessively pressed stuffing sealing rings is prevented or significantly curtailed. This, in turn, results in excessive heating and possible eventual destruction of such stuffing sealing rings.

SUMMARY OF THE INVENTION

Accordingly, it is a general object of the present invention to avoid the disadvantages of the prior art.

More particularly, it is an object of the present invention to provide a stuffing sealing arrangement which does not possess the disadvantages of the known arrangements of this kind.

Still another object of the present invention is so to construct the arrangement of the type here under consideration as to be able to achieve a controllable pressing of the stuffing sealing rings as well as a controllable throughput of lubrication water.

A concomitant object of the present invention is to design the arrangement of the above type as to be relatively simple in construction, inexpensive to manufacture, easy to use, and reliable in operation nevertheless.

In pursuance of these objects and others which will become apparent hereafter, one feature of the present invention resides in a stuffing box sealing arrangement for sealing a rotary shaft which extends into a pressure space, which arrangement comprises means for bounding two separate consecutive pressure chambers at axially spaced locations along the shaft and an intervening space sealed with respect to the exterior of the arrangement and the pressure space between the pressure chambers; a plurality of stuffing sealing rings in each of the pressure chambers; two glands each arranged around the shaft at one of the locations in registry with the respective associated plurality of stuffing sealing rings; means for independently pressing each of the glands against the respective associated plurality of stuffing sealing rings; and means for supplying lubrication water into the intervening space to continuously lubricate the pluralities of stuffing sealing rings.

It is also proposed in accordance with the present invention to provide a flange for the sealing of the intervening space, this flange simultaneously serving as the means for bounding the outer one of the sealing chambers which is associated with the outer one of the glands. In this context, it is further advantageous to provide stud bolts as the means for pressing the inner one of the glands, these stud bolts then penetrating through the outer one of the glands as well as through the flange.

In accordance with a further advantageous aspect of the present invention, the inner one of the glands is provided with a cylindrical part which is configurated so as to form a distribution chamber for the lubrication water to the two sealing chamber, this distribution chamber thus forming a part of the intervening space and being in direct communication with the means for supplying the lubrication water.

It is further advantageous when the two stuffing box glands are permanently pre-tensioned by respective spring packets. Another advantageous facet of the present invention resides in the shielding of the inner one of the sealing chambers from penetration of particulate material thereinto by the supply of rinsing water and the provision of a rinsing water gap.

Last but not least, according to an important advantageous concept of the present invention, there is provided means for determining the amount of the supplied lubrication water and means for capturing and measuring the amount of lubrication water escaping from the outer one of the sealing chambers to the exterior of the arrangement.

The novel features which are considered as characteristic of the invention are set forth in particular in the appended claims. The improved stuffing box sealing arrangement itself, however, both as to its construction and its mode of operation, together with additional features and advantage's thereof, will be best understood upon perusal of the following detailed description of certain specific embodiments with reference to the accompanying drawing.

BRIEF DESCRIPTION OF THE DRAWING

The sole Figure of the drawing is a somewhat simplified axial sectional view of the stuffing box sealing arrangement of the present invention.

DETAILED DESCRIPTION OF THE PREFERRED EMBODIMENTS

Referring now to the drawing in detail, it may be seen that the reference numeral 1 has been used therein to identify a rotary shaft which extends through a wall 2 into a pressure space 3. In the case disclosed here, the pressure space 3 is filled with water in which there are present solid particles. For the sealing of the shaft passage, there is provided a sealing block which is identified in its entirety by the reference numeral 4 and which includes a flange 5 which is connected to the wall of the pressure space 3 by only diagrammatically indicated screws 6 and is sealed with respect to such wall by means of a sealing element 7. The entire sealing system of the present invention is integrated in the sealing block 4.

A stuffing box gland 8, which acts on sealing rings 9 in an outer sealing chamber 10 is outwardly mounted on the shaft 1. The sealing chamber 10 is constituted by a flange 11 which is mounted on the sealing block 4 by means of screws 12 and is sealed with respect to the sealing block 4 by means of a sealing element 13. For the contact pressing of the sealing rings 9 via the stuffing box gland 8, there are provided stud bolts 14 which are threaded into corresponding threaded bores of the flange 11. Jam nuts 15 are positioned on the stud bolts 14 and serve for compressing a spring packet 16 so that, in this manner, the desired pressure can be exerted on the sealing rings 9.

A further stuffing box gland 17 is arranged on the shaft 1 closer to the pressure space 3 than the aforementioned stuffing box gland 8. The stuffing box gland 17 acts on sealing rings 18 which are arranged in a sealing chamber 19. This sealing chamber 19 and the requisite space for the stuffing box gland 17 are formed by a corresponding recess of the sealing lock 4. The stuffing box gland 17 receives the requisite contact pressure from stud bolts 20. The stud bolts are threaded into corresponding threaded bores of the sealing block 4 and carry jam nuts 21. A spring packet 22 which acts on the stuffing box gland 17 braces itself against the jam nuts 21. The stud bolts 20 pass through the flange 11, where they are sealed by means of respective sealing rings 23, and also through the stuffing box gland 8. Finally, the stud bolts 20 are provided at their outer of free ends with further jam nuts 24, by means of which they can be turned so that the contact pressure of the stuffing box gland can be increased or reduced via the spring packet 22. The spring packet 22, as well as, incidentally, the aforementioned spring packet 16, makes sure that the force which is adjusted by means of the stud bolts 14 or 20 acts on a permanent basis. The stud bolts 14 and 20 are arranged at the stuffing box gland 8 is an alternating succession at the respective bore center circle.

Lubrication water is supplied, at a pressure exceeding that prevailing in the pressure space 3, through a conduit 25. The rate of flow of the lubrication water is established by means of a measuring arrangement 26. In the disclosed case, the lubrication water passes through respective bores 27 provided in the sealing block 4 to a cylindrical part 28 of the stuffing box gland 17, which acts as a distribution chamber. The lubrication water then flows from the cylindrical part 28 through required annular spaces 29 present between the shaft 1 and the stuffing box gland 17 on the one hand to the sealing chamber 19 and on the other hand into an interspace 30 situated between the two sealing chambers 10 and 19 to ultimately reach even the sealing chamber 10.

As already mentioned before, a constant supply of the lubrication water and a constant rate of flow of the lubrication water between the outer surface of the rotary shaft 1 and the sealing rings 9 and 18 which are pressed against the shaft 1 are unconditionally required in order to avoid excessive heating of the sealing rings 9 or 18 during the rotation of the shaft 1. This lubrication water which flows through the sealing chambers 10 and 19 on the one hand eventually reaches the pressure space 3 and on the other hand emerges from the stuffing box gland 8 to the exterior of the sealing arrangement. Now, it is necessary not to let the amount of water flowing through the sealing chambers 10 and 19 to become too large, since this is an indication of insufficient sealing effect of the sealing rings 9 or 18. However, the amount of the cooling and/or lubrication water must also not be too small, since otherwise there would exist the danger of excessive heating of the sealing rings 9 and 18.

The stuffing box sealing arrangement of the present invention offers, in contradistinction to the initially described known arrangement, the possibility of exactly establishing what amount of the lubrication water flows through each of the sealing chambers 10 and 19 and of subsequently pointedly adjusting the contact pressure of the two stuffing box glands 8 and 17 correspondingly to the established requirements. The establishment of the respective flow-through amount occurs in such a manner that the lubrication water emerging from the outer stuffing box gland 8 is collected in a capturing and measuring arrangement which is identified with the reference numeral 31, where the amount of such escaped lubrication water is measured, whereafter this measured amount of escaped lubrication water is subtracted from the total amount of supplied lubrication water as measured by the measuring arrangement 26. The thus obtained difference then is the amount of the lubrication water which flows through the sealing chamber 19 into the pressure space 3. Thus, the contact pressure of one or of both of the two stuffing box glands 8 and 17 can be pointedly corrected correspondingly to the established values, if such correction is necessary.

Finally, the reference numeral 32 identifies still another supply conduit for rinsing water which flows through respective bores 33 of the sealing block 4 to an annular groove 34. From the annular groove 34, the rinsing water then flows through an annular gap 35 into the pressure space 3 and, in this manner, prevents the penetration of solid particles from the water contents of the pressure chamber 3 into the previously described sealing system. It is self-evident that the rinsing water, like the lubrication water, must be at a pressure which exceeds the pressure prevailing in the pressure space 3.

It will be understood that each of the elements described above, or two or more together, may also find a useful application in other types of arrangements differing from the type described above.

While the invention has been illustrated and described as embodied in an arrangement for sealing a shaft which extends into a pressure space filled with a liquid contaminated with solid particles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is new and desired to be protected by Letters Patent is set forth in the appended claims.

1. A stuffing box sealing arrangement for sealing one portion of a rotary shaft from a pressure space, the rotary shaft having another portion extending into the pressure space, the stuffing box sealing arrangement comprising:
- a housing defining two separate consecutive axially extending pressure chambers at axially spaced locations along said one portion of the rotary shaft and also defining an intervening space sealed with respect to the exterior of the arrangement and the pressure between said pressure chambers, said housing sealing said intervening space with respect to outside of said housing;
- means for sealing the one portion of the rotary shaft from a pressure space and including a plurality of stuffing sealing rings arranged in each of said pressure chambers;
- two glands each arrangable around the rotary shaft at one of said locations in registry with the respective associated plurality of stuffing sealing rings;
- means for independently pressing each of said glands against said respective associated plurality of stuffing sealing rings, said independently pressing means for each said glands being accessible from outside said housing;
- menas for supplying lubrication water into said intervening space to continuously lubricate said pluralities of stuffing sealing rings; and
- means for ascertaining the amount of lubrication water escaping from the axial inner one of said pressure chambers to the pressure space as well as the amount of lubricantion water escaping from the axial outer one of said pressure chambers to the exterior of the arrangement and including means for determining the amount of lubrication water supplied by said supplying means and means for capturing and measuring the amount of lubrication water escaping from the outer one of said pressure chambers to the exterior of the arrangment.

2. The arrangement as defined in claim 1, wherein said housing includes means for sealing said intervening space and for defining a portion of the outer one of said pressure chambers and including a flange.

3. The arrangement as defined in claim 2, wherein said pressing means for the inner one of said glands includes stud bolts which pass through the outer one of said glands and through said flange.

4. The arrangement as defined in claim 1, wherein the inner one of said glands has a cylindrical portion which is configurated as a distribution chamber for the lubrication water to the two pressure chambers to constitute at least a part of said intervening space; and wherein said supplying means directly communicates with said distribution chamber.

5. The arrangement as defined in claim 1, wherein said pressing means includes respective spring packets which permanently pre-tension said glands.

6. The arrangement as defined in claim 1, and further comprising means for preventing penetration of particulate material into the inner one of said sealing chambers, including means defining a rinsing gap around the shaft between the pressure space and said inner pressure chamber, and means for supplying rinsing water into said rinsing gap.

7. The arrangement as defined in claim 1, wherein said pressing means extends beyond said housing.

8. The arrangement as defined in claim 7, wherein said pressing means includes pressing members extending substantially in the same direction.

9. The arrangement as defined in claim 1, wherein one of said glands in arrangable closer to the pressure space than the other gland, said one gland constituting said inner gland, said inner gland being formed so as to define a portion of said intervening space in which the lubrication water passes to reach an associated one of said pressure chambers.

10. The arrangement as defined in claim 1, wherein the supplying means is formed to supply the lubrication water at a pressure higher than in the pressure space.

* * * * *